United States Patent [19]

Teraoka

[11] Patent Number: 4,511,802
[45] Date of Patent: Apr. 16, 1985

[54] RADIATION IMAGE STORAGE PANEL

[75] Inventor: Masanori Teraoka, Kaisei, Japan

[73] Assignee: Fuji Photo Film Co., Ltd., Japan

[21] Appl. No.: 496,731

[22] Filed: May 20, 1983

[30] Foreign Application Priority Data

May 24, 1982 [JP] Japan .................................. 57-87799

[51] Int. Cl.³ .............................................. G21K 4/00
[52] U.S. Cl. ................................................. 250/484.1
[58] Field of Search .......................... 250/484.1, 475.2; 428/130, 192; 378/172, 173, 181

[56] References Cited

U.S. PATENT DOCUMENTS

| 308,781 | 12/1884 | Menns | 354/180 |
|---|---|---|---|
| 2,829,265 | 4/1958 | Harper | 250/488.1 |
| 3,859,527 | 1/1975 | Luckey | 250/327.2 |
| 3,917,950 | 11/1975 | Carlson | 250/483.1 |
| 4,236,078 | 11/1980 | Kotera et al. | 250/363 R |
| 4,239,968 | 12/1980 | Kotera et al. | 250/327.2 |
| 4,350,893 | 9/1982 | Takahashi et al. | 250/484.1 |

FOREIGN PATENT DOCUMENTS 95188 11/1983 European Pat. Off. ......... 250/484.1

Primary Examiner—Janice A. Howell
Assistant Examiner—Constantine Hannaher
Attorney, Agent, or Firm—Gerald J. Ferguson, Jr.; Joseph J. Baker

[57] ABSTRACT

A radiation image storage panel comprises a substrate and a stimulable phosphor layer provided on the substrate. At least a part of the edges of end faces of the radiation image storage panel on the substrate side is chamfered. At least the end face of the radiation image storage panel including the chamfered edge is covered with a polymer film.

9 Claims, 4 Drawing Figures

RADIATION IMAGE STORAGE PANEL

BACKROUND OF THE INVENTION

1. Field of the Invention

This invention relates to a radiation image storage panel for recording and reproducing a radiation image using a stimulable phosphor which stores radiation energy and emits light upon stimulation thereof, and more particularly to a radiation image storage panel which exhibits improved transferability and damage preventing properties.

2. Description of the Prior Art

To obtain a radiation image, there is generally utilized radiography using a combination of a photographic film provided with an emulsion layer comprising a silver halide light-sensitive material and an intensifying screen. Recently, a novel method for obtaining a radiation image has been disclosed, for example, in U.S. Pat. No. 3,859,527. In the method of this patent, there is used a radiation image storage panel comprising a stimulable phosphor which emits light when stimulated by an electromagnetic wave selected from among visible light and infrared rays after exposure to a radiation. (The term "radiation" as used herein means electromagnetic wave or corpuscular radiation such as X-rays, $\alpha$-rays, $\beta$-rays, $\gamma$-rays, high energy neutron rays, cathode rays, vacuum ultraviolet rays, ultraviolet rays, or the like.) The method comprises the steps of (i) causing the stimulable phosphor of the panel to absorb a radiation passing through an object, (ii) scanning the panel with an electromagnetic wave such as visible light or infrared rays (hereinafter referred to as "stimulating rays") to sequentially release the radiation energy stored in the panel as light emission, and (iii) detecting the emitted light as an electrical signal, processing the electrical signal and converting it into an image.

The radiation image storage panel employed in the aforesaid method for recording and reproducing a radiation image releases the radiation energy stored in the panel when scanned with the stimulating rays. Therefore, after being scanned with the stimulating rays, the radiation image storage panel can be used to again store a radiation image therein. Actually, since the radiation energy stored in the radiation image storage panel is not sufficiently released therefrom only by the scanning with the stimulating rays, the panel is exposed to light having a wavelength of the stimulating rays or to heat in order to erase the radiation energy remaining in the panel after the scanning (before the next radiation image recording operation).

Basically, the radiation image stored panel employed in the aforesaid method for recording and reproducing a radiation image comprises a substrate and a stimulable phosphor layer (hereinafter referred to as phosphor layer) provided on the substrate. In general, a protective film is formed on the phosphor layer for the purpose of physically and chemically, protecting the phosphor layer. In some cases, the end faces of the radiation image storage panel are covered with polymer films to improve the mechanical strength of the panel, as described in U.S. patent application Ser. No. 434,885 (European Patent Appln. No. 82305605.6). The phosphor layer comprises an appropriate binder and a stimulable phosphor dispersed therein. The radiation image storage panel has a uniform thickness over the entire area of the panel, and generally has a rectangular appearance.

The term "rectangular" as used herein also embraces a rectangle the four corners of which are cut off.

As described above, the radiation image storage panel is repeatedly passed through the steps of recording a radiation image in the panel, scanning the panel with the stimulating rays (read out), erasing the radiation energy remaining in the panel, and recording the next radiation image in the panel. Carrying of the radiation image storage panels from one step to the next is conducted by a transfer system. The transfer system is generally provided with a transfer means comprising nip rolls for holding and carrying the panels. However, since the thickness of the conventional radiation image storage panel is uniform over the entire area thereof, the panels cannot be smoothly inserted between the nip rolls. As a result, the panels accumulate in front of the nip rolls, adversely affecting the panel carrying operation. Further, since the edges of the end faces of the radiation image storage panel are pointed at an angle of about 90°, the coverings formed on the end faces of the panel are peeled off when the panel is held and carried by the nip rolls, presenting a problem that the mechanical strength of the panel is deteriorated and the protective film or the phosphor layer of the panel is scratched by the covering material peeled off from the panel and attached to the rolls. Further since the edges of the end faces of the panel are pointed, they present a problem that, when the panels are stacked one upon another, the surface of one panel may be scratched by the edges of the end faces of the panel lying thereon, resulting in damage of the protective film or the surface of the phosphor layer of the panel.

SUMMARY OF THE INVENTION

The primary object of the present invention is to provide a radiation image storage panel exhibiting improved transferability.

Another object of the present invention is to provide a radiation image storage panel exhibiting improved damage preventing properties.

The radiation image storage panel in accordance with the present invention comprises a substrate and a stimulable phosphor layer provided on said substrate, wherein at least a part of the edges of end faces of said radiation image storage panel on the substrate side is chamfered, and at least the end face of said radiation image storage panel including said chamfered edge is covered with a polymer film.

The term "chamfering" as used herein embraces both the case wherein the chamfered section is a flat surface and the case wherein it is a curved surface.

In the present invention, since at least a part of the edges of end faces of the radiation image storage panel on the substrate side is chamfered, the thickness of the end face portion of the panel including the chamfered edge is smaller than the thickness of the panel body. As a result, the radiation image storage panel in accordance with the present invention can be smoothly inserted between the nip rolls of the transfer system from the thinner end face portion of the panel and, therefore, exhibits improved transferability. Further, the radiation image storage panel does not present a problem that the mechanical strength of the panel is deteriorated due to peeling-off of the end face covering formed on the side face of the panel or that the protective film or the phosphor layer of the panel is scratched by the end face covering material peeled off and attached to the nip rolls. The present invention can also prevent the protective film or the surface of the phosphor layer of the panel from being damaged by pointed edges of other panels.

In the present invention, in order to improve the transferability of the radiation image storage panel, the edge of the end face of the panel on the substrate side facing the advance direction of the panel should be chamfered. However, in order to prevent the radiation image storage panel from being damaged, the edges of all end faces of the panel on the substrate side should preferably be chamfered. In order to further improve the transferability and damage preventing properties, the edges of the end faces of the panel on the phosphor layer side should also be chamfered.

In general, the radiation image storage panel is rectangular. (As mentioned above, "rectangular" also embraces a rectangle the four corners of which are cut off.) The rectangular radiation image storage panel in accordance with the present invention embraces the following aspects:

(i) A radiation image storage panel wherein only the edge of one side face of the panel on the substrate side is chamfered.

(ii) A radiation image storage panel wherein the edge of one side end face of the panel on the substrate side, and the edge of one side end face of the panel on the phosphor layer side opposite to said edge on the substrate side are chamfered.

(iii) A radiation image storage panel wherein the edges of two side end faces opposite to each other on the substrate side of the panel are chamfered.

(iv) A radiation image storage panel wherein the edges of two side end faces opposite to each other on the substrate side of the panel, and the edges of two side end faces of the panel on the phosphor layer side opposite to said edges on the substrate side are chamfered.

(v) A radiation image storage panel wherein the edges of all side end faces of the panel on the substrate side are chamfered.

(vi) A radiation image storage panel wherein the edges of all side end faces of the panel on the substrate side, and the edges of all side end faces of the panel on the phosphor layer side are chamfered.

In the present invention, the end face of the radiation image storage panel including the chamfered edge is covered with a polymer film to improve the mechanical strength of the panel.

From the viewpoint of panel transferability, the chamfering of the substrate should preferably be carried out within the range of 1/50 to 1 with respect to the thickness of the substrate to be chamfered, as measured in the direction normal to the radiation image storage panel. When the phosphor layer of the panel is chamfered, the chamfering should preferably be carried out within the range of 1/50 to 1 with respect to the thickness of the phosphor layer to be chamfered, as measured in the direction normal to the panel. When the edge of an end face on the substrate side and the edge of the phosphor layer opposite to said edge on the substrate side are chamfered, the chamfering range of at least one of the substrate and the phosphor layer should desirably be less than 1.

DESCRIPTION OF THE PREFERRED EMBODIMENTS

The present invention will hereinbelow be described in further detail with references to the accompanying drawings.

FIGS. 1 to 4 show various embodiments of the radiation image storage panel in accordance with the present invention, wherein the appearance of the panel is rectangular.

Figure 1:
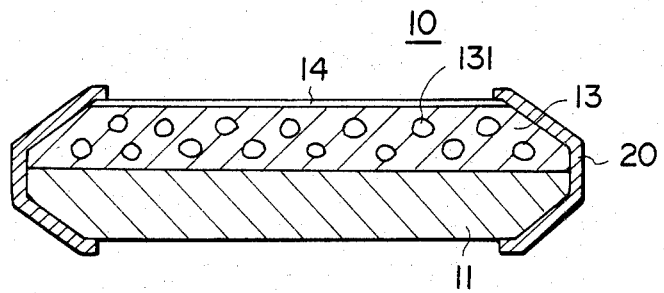
FIGS. 1 to 4 are vertical sectional views showing various embodiments of the radiation image storage panel in accordance with the present invention.

In FIG. 1, a radiation image storage panel 10 comprises a substrate 11, a phosphor layer 13 comprising a binder and a stimulable phosphor 131 dispersed therein, and a protective film 14, which are stacked one upon another in this order. In the panel 10, the edges of the side end faces opposite to each other on the side of the substrate 11, and the edges of the side end faces on the side of the phosphor layer 13 opposite to the aforesaid edges on the side of the substrate 11 are chamfered. The side end faces of the panel 10 including the chamfered edges are coated with polymer films 20 formed by use of a polymeric material to improve the mechanical strength of the panel 10. Since the edges of the side end faces of the panel 10 are chamfered as shown in FIG. 1, the panel 10 can be easily inserted between the nip rolls of a transfer system. Therefore, troublesome problems such as panel clogging in the transfer system do not occur. Further, since the polymer films 20 are not peeled off when the panel 10 is held between the nip rolls, the mechanical strength of the panel 10 is not deteriorated even when the panel 10 is used repeatedly. Also, since the end face covering material is not drawn out and attached to the nip rolls, there is no risk of the protective film or the phosphor layer of the panel 10 being scratched by such a material attached to the nip rolls. Also when many panels are stacked one upon another, there is no risk of an upper panel damaging the protective film or the surface of the phosphor layer of a lower panel.

Figure 2:
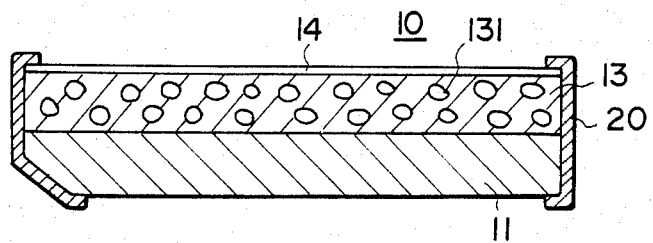
Figure 3:
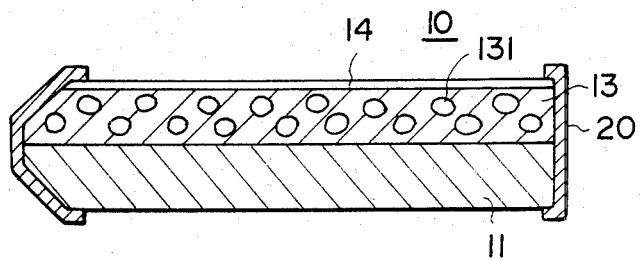
Figure 4:
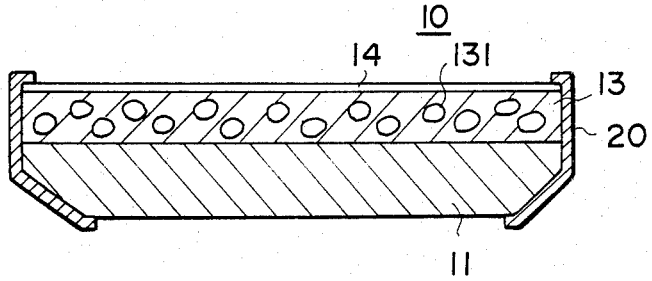

FIG. 2 shows another embodiment of the radiation image storage panel wherein only the edge of one side end face of the panel 10 on the side of the substrate 11 is chamfered. FIG. 3 shows a further embodiment of the radiation image storage panel wherein the edge of one side end face of the panel 10 on the side of the substrate 11, and the edge of one side end face of the phosphor layer 13 opposite to the aforesaid edge on the side of the substrate 11 are chamfered. FIG. 4 shows a further embodiment of the radiation image storage panel wherein the edges of two side end faces opposite to each other on the side of the substrate 11 are chamfered.

In the embodiments of FIGS. 1 to 4, the radiation image storage panel is carried by the transfer system with the chamfered edge facing forward. In the embodiments of FIGS. 1 and 4, since two end faces of the radiation image storage panel are chamfered, the panel may be carried in either direction. In the embodiments of FIGS. 2 and 3, since only one end face of the radiation image storage panel is chamfered, the panel can be carried in only one direction.

Besides the embodiments shown in FIGS. 1 to 4, it is also possible to chamfer the edges of all sides end faces of the substrate and the edges of all side end faces of the phosphor layer. These embodiments are particularly suitable for preventing the protective film or the surface of the phosphor layer of the radiation image storage panel from being damaged when the panels are stacked one upon another. The radiation image storage panel in accordance with the present invention may also have various shapes other than the rectangular shape, for example, circular, trapezoidal, triangular, hexagonal and octagonal shapes. Also in such a radiation image storage panel having a shape other than the rectangular shape, at least a part of the edges of the end faces of the substrate side is chamfered to improve the transferability and damage preventing properties of the panel. Also in these embodiments, carrying of the radiation image storage panel is conducted with the chamfered edge side of the panel facing forward.

The radiation image storage panel in accordance with the present invention may be formed by chamfering at least a part of the edges of the end faces of the substrate side and then forming the phosphor layer on the substrate. Alternatively, the panel may be formed by providing the phosphor layer on the substrate and then chamfering at least a part of the edges of the end faces of the substrate.

The substrate may be made, for example, of ordinary paper, baryta paper, resin coated paper, pigment paper containing a pigment such as titanium dioxide, converted paper such as paper sized with polyvinyl alcohol or the like, a sheet made of polyethylene, polypropylene, polyester such as polyethylene terephthalate, or other high-molecular material, or a metal sheet such as aluminium foil, aluminium alloy foil, or the like. Among these materials, a sheet made of a flexible high-molecular material is preferable.

As the stimulable phosphor, it is possible to use, for example, phosphor represented by the formula SrS: Ce, Sm; SrS;Eu,Sm; La$_2$O$_2$S:Eu,Sm; or (Zn,Cd)S:Mn,X wherein X is a halogen, as shown in U.S. Pat. No. 3,859,527. Further, as the stimulable phosphor, there can be used ZnS:Cu,Pb, BaO.$x$Al$_2$O$_3$:Eu wherein $0.8 \leq x \leq 10$; M$^{II}$O.$x$SiO$_2$:A wherein M$^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$; and LnOX:$x$A wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. The stimulable phosphor may further be a phosphor represented by the formula (Ba$_{1-x}$,M$^{II}$$_x$)FX:$y$A wherein M$^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$, as shown in U.S. Pat. No. 4,239,968. As the stimulable phosphor can also be used a phosphor represented by the formula (Ba$_{1-x-y}$, Mg$_x$,Ca$_y$)FX:aEu$^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$, as shown in Japanese Unexamined Patent Publication No. 55(1980)-12143. However, in the radiation image storage panel in accordance with the present invention, any other phosphors may be used insofar as they can emit light when exposed to stimulating rays after exposure to a radiation. From the practical viewpoint, it is preferable that the stimulable phosphor emits light having a wavelength within the range of 300 nm to 500 nm when exposed to stimulating rays having a wavelength within the range of 450 nm to 1,100 nm, particularly within the range of 450 nm to 750 nm. The thickness of the phosphor layer is generally within the range of 20$\mu$ to 1 mm, preferably within the range of 100$\mu$ to 500$\mu$. The phosphor layer of the radiation image storage panel may be colored as disclosed in European Patent Publication No. 21,174, or may contain white powder dispersed therein as disclosed in U.S. Pat. No. 4,350,893.

As the material of the polymer film for forming the end face covering, any material that is generally employed for this purpose may be used. Preferably, a polymer material consisting of a polyurethane resin or an acrylic resin as disclosed in U.S. patent application Ser. No. 434,885 (European Patent Application No. 82305605.6) should be used. Among the aforesaid polyurethane resins, polymers having the urethane group $-(-NH-COO-)-$ in the molecular chain, for example, the reaction products (i) to (vi) described below, are more preferable as the end face covering material. In the general formulas representing the reaction products described below, R and R' respectively designate a bivalent group residue, and x is an integer satisfying the condition of $1 < x < 800$. The bivalent group residue designated by R should preferably be an alkylene or arylene group containing 1 to 20 carbon atoms, for example, $-(-CH_2-)-_p$ wherein p designates an integer within the range of 1 to 8,

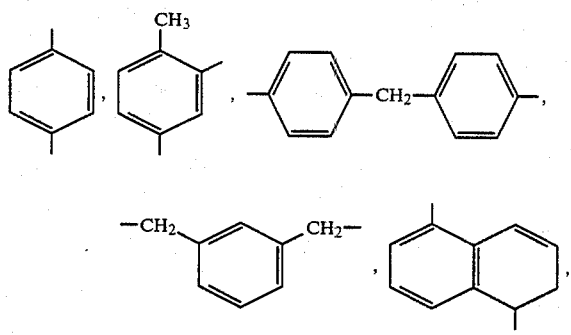

or the like.

(i) Polyaddition reaction product of diisocyanate with glycol represented by the general formula $-(-CON-H-R-NHCOO-R'-O)-_x$.

(ii) Polycondensation reaction product of bischloroformate ester with diamine represented by the general formula

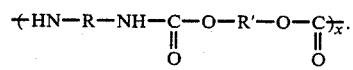

(iii) Polycondensation reaction product of bisurethane with glycol represented by the general formula

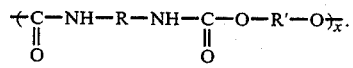

(iv) Polycondensation reaction product of biscarbamoyl chloride with glycol represented by the general formula

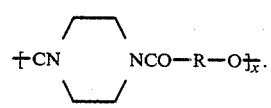

(v) Heat polymerization reaction product of oxyacid azide represented by the general formula

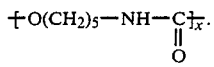

(vi) Polycondensation reaction product of trichloroacetate of glycol with diamine represented by the general formula

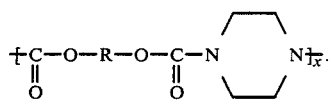

Specifically, the polyurethane used as the end face covering material may be a polyaddition reaction product of 4,4'-diphenyl methane diisocyanate with 2,2'-diethyl-1,3-propanediol, a polyaddition reaction product of hexamethylene diisocyanate with 2-n-butyl-2-ethyl-1,3-propanediol, a polyaddition reaction product of 4,4'-diphenyl methane diisocyanate with bisphenol A, a polyaddition reaction product of hexamethylene diisocyanate with resorcinol, or the like.

The aforesaid acrylic resin means a polymer obtained by polymerization (including copolymerization) of a monomer representede by the general formula of

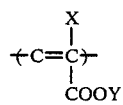

wherein X designates $C_nH_{2n+1}$, Y denotes $C_mH_{2m+1}$, n and m respectively designate integers satisfying the conditions of $0 \leq n \leq 4$ and $0 \leq m \leq 6$. Any of such polymers can be used as the end face covering material. Specifically, the acrylic resin used as the end face covering material may be a homopolymer or a copolymer of acrylic acid, methyl acrylate, ethyl acrylate, butyl acrylate, methylacrylic acid, methylmethacrylic acid, or the like (for example, acrylic acid-styrene copolymer, acrylic acid-methylmethacrylate copolymer). Among the acrylic resins, polymethyl methacrylate which is a homopolymer of methylmethacrylic acid is particularly preferable as the end face covering material. As the acrylic resin, a polymer having a polymerization degree within the range of $10^4$ to $5 \times 10^5$ should prferably be used.

As the end face covering material, it is also possible to employ any of combinations of the aforesaid polyurethane or acrylic resin (particularly the acrylic resin) with various other polymeric materials (blending polymers). As the blending polymer, a vinyl chloride-vinyl acetate copolymer is most preferable. Accordingly, the following polymeric materials should preferably be employed as the end face covering material:
(1) Polyurethane
(2) Acrylic resin
(3) A mixture of an acrylic resin and a vinyl chloride-vinyl acetate copolymer.

As the vinyl chloride-vinyl acetate copolymer in the polymeric material (3) listed above, a copolymer wherein the content of vinyl chloride is within the range of 70% to 90% and the polymerization degree is within the range of 400 to 800 should preferably be employed. Further, the mixing ratio of the acrylic resin to the vinyl chloride-vinyl acetate copolymer should preferably be within the weight ratio range of 1:1 to 4:1.

In the embodiments described above, the phosphor layer is directly formed on the substrate. However, a prime-coating layer for improving adhesion between the phosphor layer and the substrate may be formed therebetween. Further, a light-absorbing layer or a light-reflecting layer may be formed between the phosphor layer and the substrate.

I claim:
1. A radiation image storage panel comprising a substrate and a stimulable phosphor layer provided on said substrate, wherein at least a part of the edges of end faces of said radiation image storage panel on the substrate side is chamfered, and at least the end face of said radiation image storage panel including said chamfered edge is covered with a polymer film.

2. A radiation image storage panel as defined in claim 1 wherein said radiation image storage panel is rectangular.

3. A radiation image storage panel as defined in claim 2 wherein only the edge of one side end face of the panel on said substrate side is chamfered.

4. A radiation image storage panel as defined in claim 2 wherein the edge of one side end face of the panel on said substrate side, and the edge of one side end face of the panel on said phosphor layer side opposite to said edge on said substrate side are chamfered.

5. A radiation image storage panel as defined in claim 2 wherein the edges of two side end faces opposite to each other on said substrate side of the panel are chamfered.

6. A radiation image storage panel as defined in claim 2 wherein the edges of two side end faces opposite to each other on said substrate side of the panel, and the edges of two side end faces of the panel on said phosphor layer side opposite to said edges on said substrate side are chamfered.

7. A radiation image storage panel as defined in claim 2 wherein the edges of all side end faces of the panel on said substrate side are chamfered.

8. A radiation image storage panel as defined in claim 2 wherein the edges of all side end faces of the panel on said substrate side, and the edges of all side end faces of the panel on said phosphor layer side are chamfered.

9. A radiation image storage panel as defined in any of claims 1 to 8 wherein the chamfering of said substrate is carried out within the range of 1/50 to 1 with respect to the thickness of said substrate.

* * * * *